United States Patent
Bakke et al.

(10) Patent No.: US 8,713,180 B2
(45) Date of Patent: Apr. 29, 2014

(54) ZERO-COPY NETWORK AND FILE OFFLOAD FOR WEB AND APPLICATION SERVERS

(75) Inventors: Mark A. Bakke, Maple Grove, MN (US); Timothy J. Kuik, Lino Lakes, MN (US); David P. Thompson, Rogers, MN (US)

(73) Assignee: Cisco Technology, Inc., San Jose, CA (US)

( * ) Notice: Subject to any disclaimer, the term of this patent is extended or adjusted under 35 U.S.C. 154(b) by 1665 days.

(21) Appl. No.: 11/386,487

(22) Filed: Mar. 22, 2006

(65) Prior Publication Data

US 2006/0294234 A1    Dec. 28, 2006

Related U.S. Application Data

(60) Provisional application No. 60/693,133, filed on Jun. 22, 2005.

(51) Int. Cl.
*G06F 15/173*    (2006.01)

(52) U.S. Cl.
USPC .......................................... 709/226

(58) Field of Classification Search
USPC .......... 709/203, 213, 223–224, 250; 370/401, 370/469
See application file for complete search history.

(56) References Cited

U.S. PATENT DOCUMENTS

| | | | |
|---|---|---|---|
| 6,544,295 B1* | 4/2003 | Bodnar | 709/219 |
| 7,424,710 B1* | 9/2008 | Nelson et al. | 718/1 |
| 7,502,884 B1* | 3/2009 | Shah et al. | 710/316 |
| 2003/0046330 A1* | 3/2003 | Hayes | 709/201 |
| 2005/0039180 A1* | 2/2005 | Fultheim et al. | 718/1 |
| 2006/0104295 A1* | 5/2006 | Worley et al. | 370/401 |

* cited by examiner

*Primary Examiner* — Kevin Mai
(74) *Attorney, Agent, or Firm* — Patterson & Sheridan, LLP

(57) ABSTRACT

Methods and apparatus for transferring data from an application server are provided. By offloading network and file system stacks to a common stack accessible by multiple operating systems in a virtual computing system, embodiments of the present invention may achieve data transfer support for web and application servers without the data needing to be copied to or reside in the address space of the server operating systems.

24 Claims, 5 Drawing Sheets

SERVER USING OFFLOAD STACK WITH SENDFILE()

ZERO-COPY NETWORK AND FILE OFFLOAD FOR WEB AND APPLICATION SERVERS

RELATED APPLICATIONS

The present invention claims benefit of provisional application Ser. No. 60/693,133, entitled "Network Stack Offloading Approaches" filed on Jun. 22, 2005, herein incorporated by reference in its entirety.

BACKGROUND OF THE INVENTION

1. Field of the Invention

The present invention generally relates to computer networks and, more particularly, to offloading network and file services.

2. Description of the Related Art

The primary task of web and application servers is typically to retrieve files from local file systems and send the file contents to remote clients, for example, over established Transmission Control Protocol (TCP) connections. In a typical application, a remote client connected to a server over a company Intranet or the Internet may request a file from a server. As an example, a web server may receive a request for a file (e.g., a document, image, HTML file, or the like) from a client connected via a TCP socket connection, retrieve the file, and send the file to the requester.

FIG. 1 illustrates such a file access involving a conventional server system. An operating system (e.g., Linux, Windows, or some other operating system) usually segregates the available system memory (and other resources) into user space 110 and kernel space 120. The kernel space is typically reserved for running the kernel, device drivers and any kernel extensions and includes file systems, network interface services, and the like. On the other hand, user space includes memory areas used by user applications. User applications cannot typically access the kernel space directly and, similarly, kernel code cannot access the user space without first checking whether the page is present in memory or swapped out.

As illustrated, when a request for a file is received by an application server 122, the application server 122 typically issues several read requests to copy data from the file system buffer cache 130 in kernel space 120 to buffers in user space 110. For example, in the kernel, the requested data may be first retrieved (e.g., from disk) and copied into the file system buffer cache 130 and then copied into memory the application server 122 can access, such as a buffer created by the application server 122 for this purpose and specified with the read request.

After copying the data into user space, the application server 122 sends the data back out to buffers 140 (e.g., TCP socket buffers) in kernel space 120. In this typical scenario, the application server 122 never needs to actually examine the data. Thus, copying the data from the file system buffer cache 130 to user space is inefficient, resulting in processing delays and consumption of resources (processing and memory resources) in user space 110.

In an effort to more efficiently transfer data, mechanisms, such as the Linux sendfile command, have been created that attempt to avoid inefficient copying of data to and from user space. Rather than copying read data from the file system buffer cache 130 into user space 110, only to send it back down, the application server 122 may issue a single sendfile command specifying a descriptor of a file from which data is to be read from (as well as a location within the file and number of bytes to read), and a descriptor of a socket on which the file will be sent. Because this transfer occurs within the kernel, a copy to and from user space of the application server may be avoided.

Unfortunately, this approach still consumes kernel resources, requiring copying data into the kernel file system buffer cache, writing out to socket buffers, and is less than optimal. As an example, in virtual machine systems running multiple operating system images, for security reasons, care must be taken to ensure each operating system image cannot access memory allocated by the other operating system images. As a result, copying data into kernel space (e.g., to process a sendfile command) typically entails mapping physical memory pages into the operating system image virtual address space. This mapping is typically a lengthy, processing intensive task involving access to operating system image page tables.

Therefore, what is needed is a more efficient mechanism for transferring data from a server, for example, that reduces the impact on local and kernel space resources.

SUMMARY OF THE INVENTION

Embodiments of the present invention provide methods and apparatus for transferring data from a server.

One embodiment provides a method for transferring data in response to a command issued from an application server. The method generally includes creating an offload stack structure running on one or more processor cores that may or may not be separate from one or more processor cores on which an operating system image executing the application server is running, the offload stack structure providing at least network and file stack resources, providing an interface to share network and file resources of the offload stack between multiple operating system images running on the multi-core system, and providing zero-copy data transfer support for the application server by processing the command issued from the application server to the offload stack without the need to copy data targeted by the command to address space of the operating system image on which the application server is running.

Another embodiment provides a host system generally including a plurality of processing cores, one or more operating system images running on one or more of the processing cores, an application server running on one of the operating system images, and an offload stack running on one or more processor cores separate from the one or more processor cores on which the operating system image running the application server is running. The offload stack structure generally provides zero-copy data transfer support for the application server by processing commands issued from the application server without the need to copy data targeted by the command to address space of the operating system image on which the application server is running.

Another embodiment provides a networked computing system generally including one or more host systems, each comprising one or more operating system images and an application server running on at least one of the operating system images, and a remote device coupled to the one or more host systems via a network connection and having an offload stack. The offload stack generally provides zero-copy data transfer support for the application server by processing commands issued from the application server without the need to copy data targeted by the command to address space of the operating system image on which the application server is running.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

By offloading network and file system stacks to a common stack accessible by multiple operating system images in a virtual computing system, embodiments of the present invention may achieve data transfer support for web and application servers without the data needing to be copied to or reside in the address space of the server operating system images. This "zero-copy" data transfer support may enable existing application servers to handle much larger volumes of traffic than conventional techniques without requiring significant modification to existing application server code.

To facilitate understanding, the following description will refer to a virtual computing environment in which multiple operating system images share one or more processor cores, possibly on the same central processing unit (CPU), as one type of application in which embodiments of the present invention may be used to advantage. However, those skilled in the art will recognize that embodiments of the present invention may be more generally applied in a variety of computing environments to achieve efficient data transfer by distancing the data path of requested data from the server receiving the request by offloading network and file services.

An Exemplary Common Offload Stack

Figure 1:
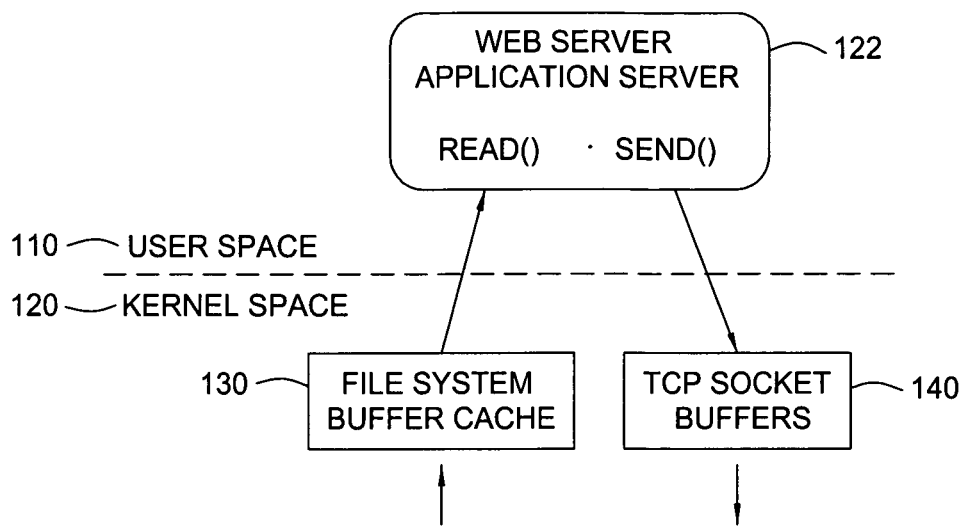
FIG. 1 illustrates an exemplary file access data path in conventional network systems in accordance with the prior art.
Figure 2:
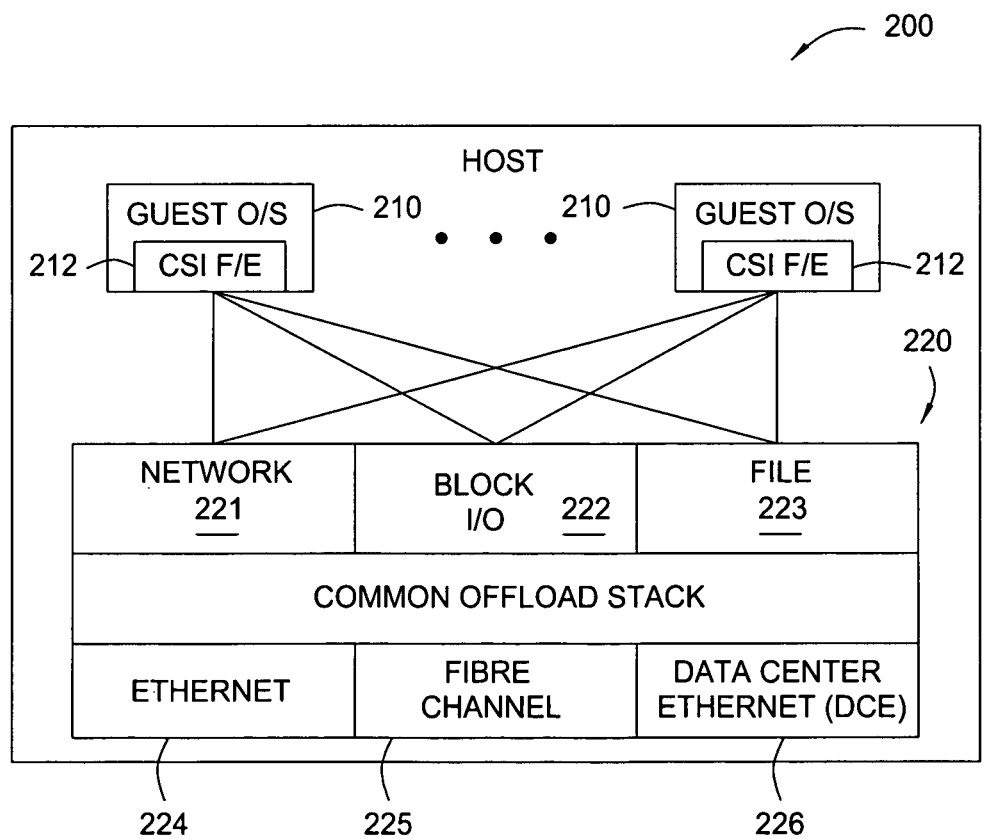
FIG. 2 illustrates a host utilizing an offload stack in accordance with one embodiment of the present invention.

FIG. 2 illustrates an exemplary host system 200, in which a plurality of operating systems (or OS images) 210 share a common offload stack 220. The common offload stack may operate as described in previously referenced provisional application Ser. No. 60/693,133, entitled "Network Stack Offloading Approaches" filed on Jun. 22, 2005. The host system 200 may include a number of resources, such as multiple processor cores and memory, shared between the operating systems 210. For example, each operating system 210 may be allocated some portion of shared memory and some portion or all processing bandwidth of one or more processor cores. Such a system is commonly referred to as a virtual system because, while the operating systems may share resources, they may operate independently, utilizing their allocated resources, as if each was operating in a separate computer system.

The growth of communications between devices (up to and beyond 1 Gbps) has led to rapidly increasing burdens on central processors (CPU), to implement communication processing (TCP/IP) functions. Servers utilizing multiple processors (or single CPUs with multiple processor cores) have been designed in an effort to achieve sufficient processor cycles to service application requirements and management of the communications stack, whether TCP/IP, any other type of interfaces, including peripheral stacks such as Fibre Channel, Infiniband, Firewire (IEEE 1394), USB, Bluetooth, and wireless 802.11. Along with increases in bandwidth, security requirements for inspecting traffic flows and protection are becoming more stringent and place a correspondingly higher burden on the CPU. Security issues are even more of a challenge in platforms with multiple operating systems, when one operating system seeks to modify space shared with another.

A variety of security functions rely on communications stacks, such as virtual private network VPN (functions), antivirus, inline encryption and message integrity, discovery, and identity protocols. Each of these functions requires management, especially where they cross operating system boundaries, resulting in a corresponding increase in CPU burden. For some embodiments of the present invention, however, the common offload stack 220 may offer a unified user interface that provides a mechanism for operating systems to offload security and related network management functions. By utilizing virtualization, the common offload stack 220 may provide a flexible open platform for network and I/O control functions acting, in some cases, as an integrated router between multiple operating systems 210 of the host system 200. In some cases, the offload stack may even run on a remote system (as described in further detail below, with reference to FIG. 6).

For some embodiments, the offload stack 220 may run on a separate core of a multi-core processor or, for some cases, even on a separate processor or offload card (as will be described in greater detail below with reference to FIG. 5B). The offload stack 220 may control all network and block storage interfaces, and can be shared between the multiple guest operating systems 210. In order to communicate with the offload stack 220, each operating system 210 may include a common stack interface front end (CSI F/E) 212, for example, implemented as a set of kernel drivers. The CSI F/E 212 may allow applications running in the operating systems 210 to communicate with network, block I/O, and file interfaces 221, 222, and 223, respectively, of the offload stack 220.

Figure 3:
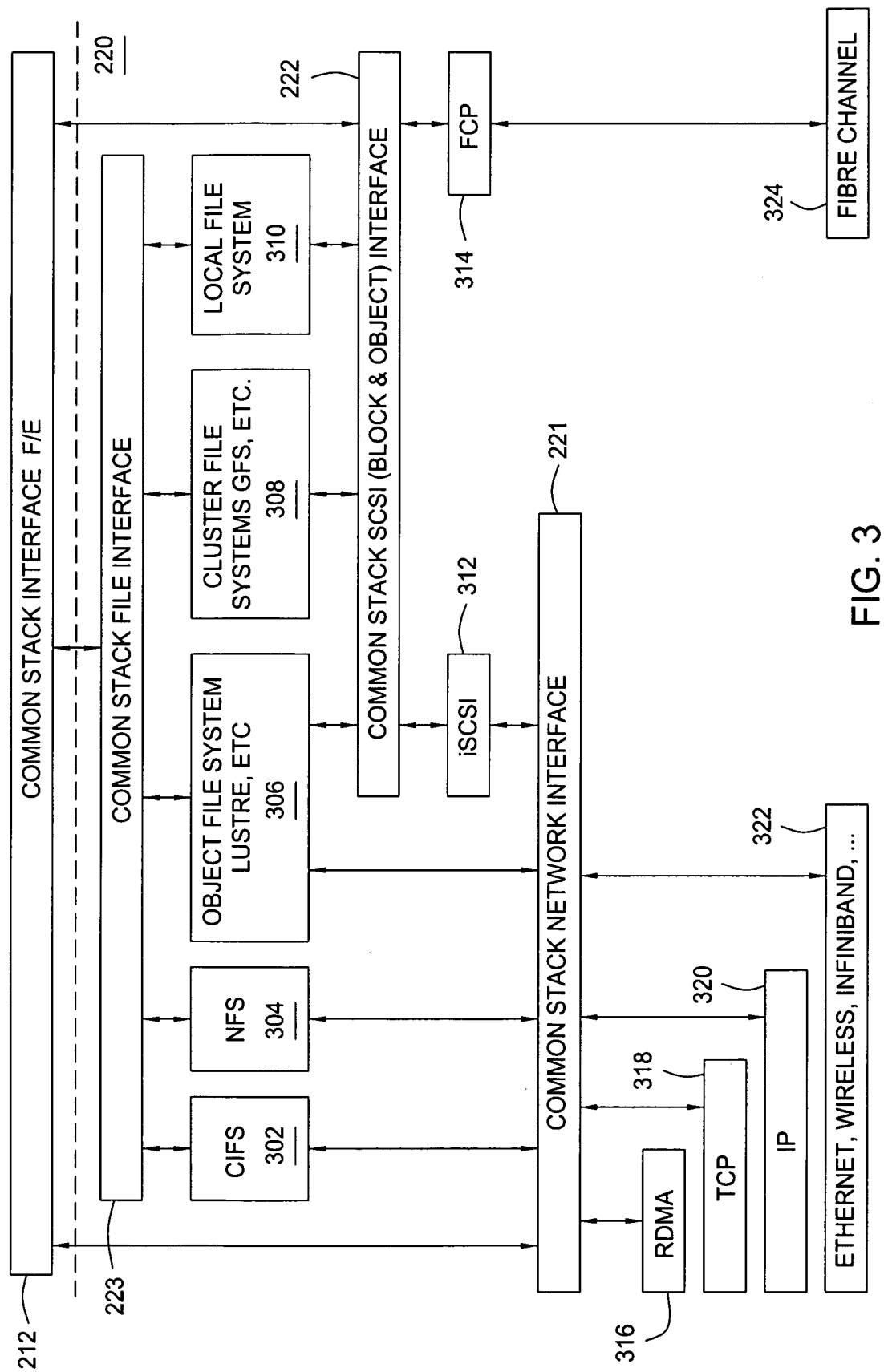
FIG. 3 illustrates a detailed block diagram of an offload stack in accordance with one embodiment of the present invention.

FIG. 3 illustrates the types of network, block I/O, and file functions that may be offloaded to the offload stack 220, and available to the operating systems 210 via the CSI F/E 212, according to one embodiment of the present invention. As illustrated, the network offload functions may include any type of appropriate network processing functions, such as RDMA 316, TCP 318, IP 320, and/or any other type of network functions 322, such as Ethernet, Infiniband, and/or wireless protocols (e.g., 802.11). By providing access to the offload stack via a socket interface, existing applications will not require changes to take advantage of offloading these functions.

As illustrated, the offload stack 220 may also provide file and block I/O functions, via file interface 223 and block I/O interface 222, respectively. The file system types may include the common Internet file system (CIFS) 302, the network file system (NFS) 304, an object file system 306 (e.g., Lustre), cluster type file system 308 (e.g., GFS), and a local file system 310. The CSI FE may be configured such that the file interface 223 is accessible under a virtual file system VFS (virtual file system) of the host 210.

The block I/O interface 222 may provide functional support for standard storage interfaces. For example, a small computer system interface (SCSI) support 312 may allow connection of SCSI (or iSCSI) storage devices, while a Fibre channel protocol (FCP) support 314 may allow connection of a storage device via a Fibre Channel interface 324.

In essence, the offload stack 220 appears to the operating systems 210 as being on the network. As a result, the network, file, and I/O functionality allow the offload stack 220 to function, in effect, as an intermediate embedded network device capable of bridging, switching or even routing between hosts on the server, and off the server when operating in conjunction with other (external) network devices deeper in a network.

Zero-Copy File Transfers Using an Offload Stack

As previously described, when transferring files requested from application servers using conventional network communications, a high cost is incurred to copy data between kernel buffers and user process virtual memory at the socket layer. However, by offloading network and file system stacks (both network and local file system) in the same common offload stack, embodiments of the present invention may be able to achieve "zero-copy" support for web and application servers by avoiding the need for data to be copied or even reside in the host address space. As a result, servers utilizing this approach may be able to handle significantly larger volumes of traffic than when utilizing conventional approaches and, in some cases, without significant modification to server application code.

Figure 4:
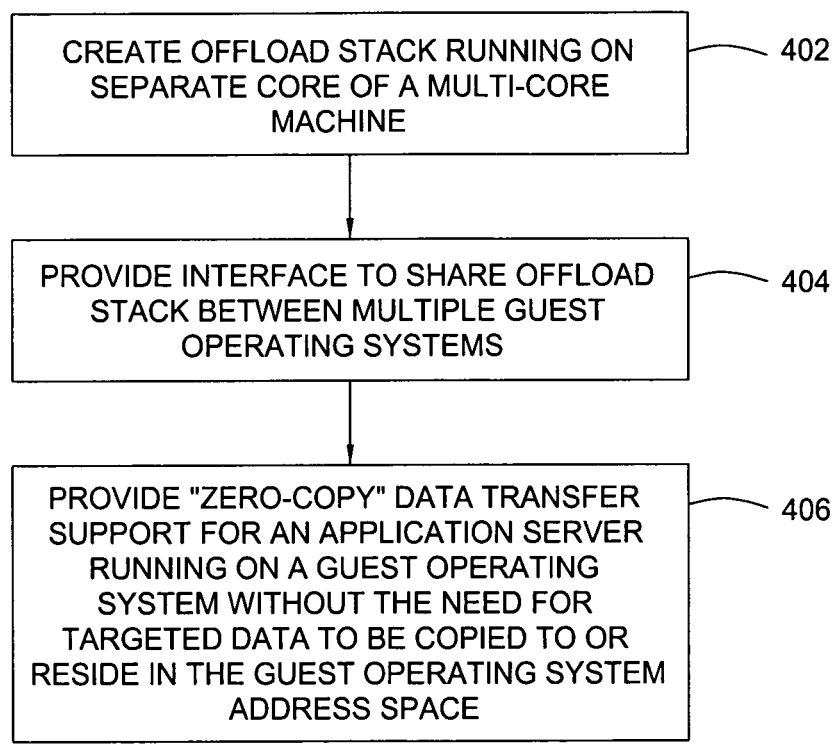
FIG. 4 is a flow diagram of exemplary operations for transferring data utilizing an offload stack in accordance with embodiments of the present invention.

FIG. 4 is a flow diagram of exemplary operations 400 for performing zero-copy data transfer in accordance with embodiments of the present invention, utilizing an offload stack. The operations begin, at step 402, by creating an offload stack running on a separate core of a multi-core machine. As described above, depending on the embodiment, the offload stack may be running on a separate dedicated physical core, multiple physical cores, or a virtual core allocated some portion of one or more physical cores.

At step 404, an interface to share the offload stack between multiple guest operating systems is provided. At step 406, zero-copy data transfer support for an application server running on a guest operating system is provided. Referring back to FIG. 2, the shared interface may include a combined interface including access to offloaded network services (via interface 221), block I/O services (via interface 222), and file services (via 223). The guest operating systems may access the services via a set of drivers, such as common shared interface (CSI) front end code also shown in FIG. 2. By offloading both the network and file system stacks (both network and local file system) in the same offload engine, the zero-copy data transfer support may avoid the need for targeted data to be copied to or reside in the guest operating address space. As a result, an application server may be able to handle much larger volumes of traffic, without significant modification.

Figure 5A:
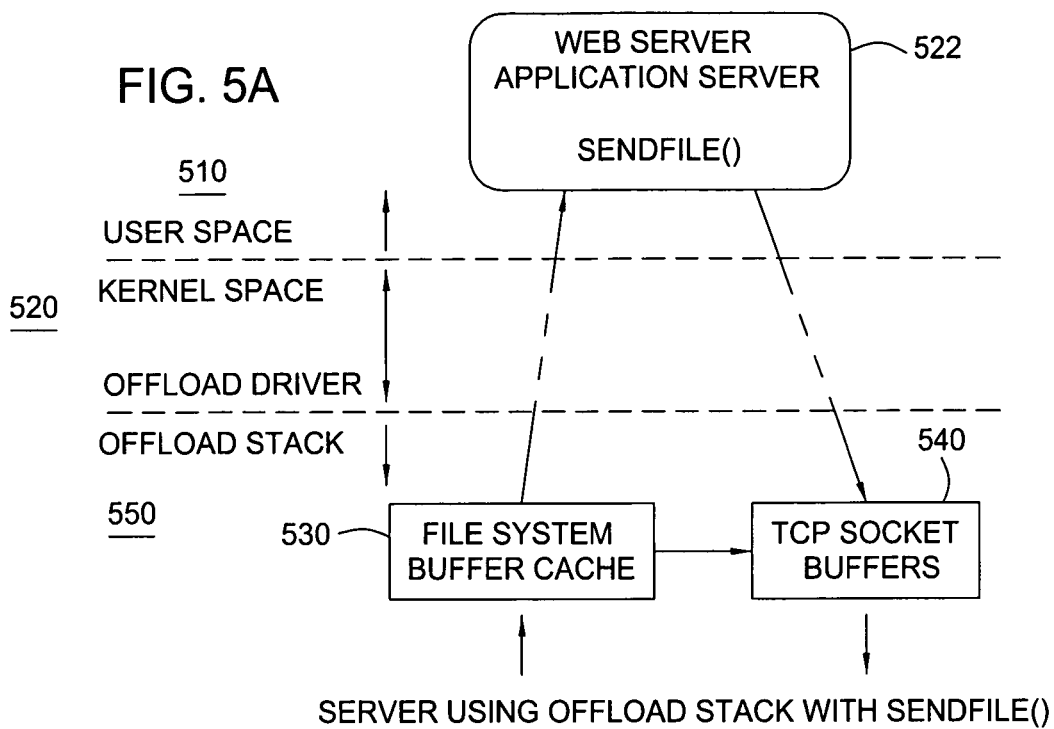
FIGS. 5A and 5B illustrate exemplary file access data paths utilizing an offload stack, in accordance with one embodiment of the present invention.

FIG. 5A illustrates how an offload stack 550 may allow a data path of data transferred by an application server 522 to be removed from the address space of the operating system running the application server. In other words, the offload stack 550 may allow the application server 522 to transfer data without copying the data to user space 510 or kernel space 520, by sending a command (e.g., a sendfile command) specifying a source from which to read (e.g., a file or socket) and a write destination (e.g., a socket). In response to the command, the offload stack 550 in accordance with one embodiment of the present invention, may retrieve data from the specified source (e.g., into a file system buffer cache 530) and send the data directly to the specified write destination (e.g., to a socket connection via TCP socket buffers 540).

For some embodiments, a command issued by the application server 522 to achieve zero-copy support, may include a variety of arguments to specify what data to transfer and to where. For example, a sendfile command issued by the application server 522 and compatible with the offload stack may include arguments for specifying a descriptor of a file to read from (in_fd), a file to write to or stream socket on which the data will be sent on (out_fd). The command may optionally include a pointer to an offset field which specifies an offset location in a specified file to begin reading from (*offset), as well as a number of bytes to read/send (count). For some embodiments, to provide indication of successful completion of the command, the location of the byte immediately following the last byte sent from the file may be written to *offset.

To enable complete offload of the sendfile command, the out_fd may be converted to an offload stack specific file or socket identifier and the in_fd may be converted to an offload stack file identifier before sending the sendfile command over to the offload stack. The offload stack may then perform the complete I/O transaction on the offload processor(s), whether real or virtual. When the transaction has completed, status may be returned to the guest domain (including the value to be written to *offset) so that the originating sendfile( ) call can return appropriate status to the calling user application.

Figure 5B:
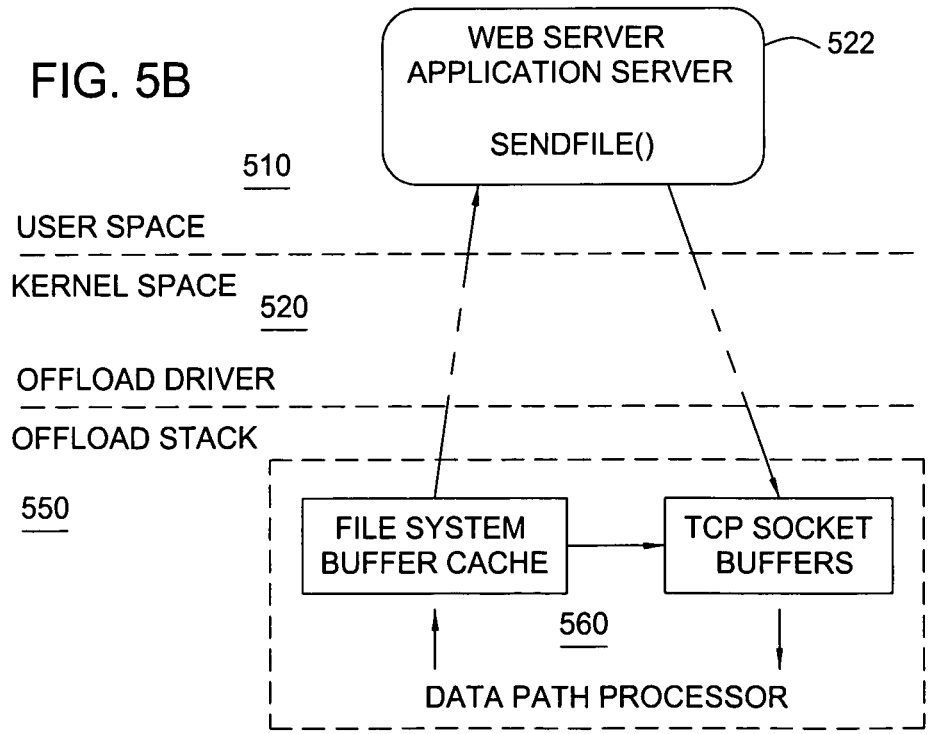

As illustrated in FIG. 5B, for some embodiments, the transfer data path may be moved even farther from the application server issuing the sendfile command, by offloading the offload stack 550 to a separate data path processor 560. Depending on the particular embodiment, the data path processor 560 may be a completely separate processor and may even be running on a separate "offload engine" interface card.

Figure 6:
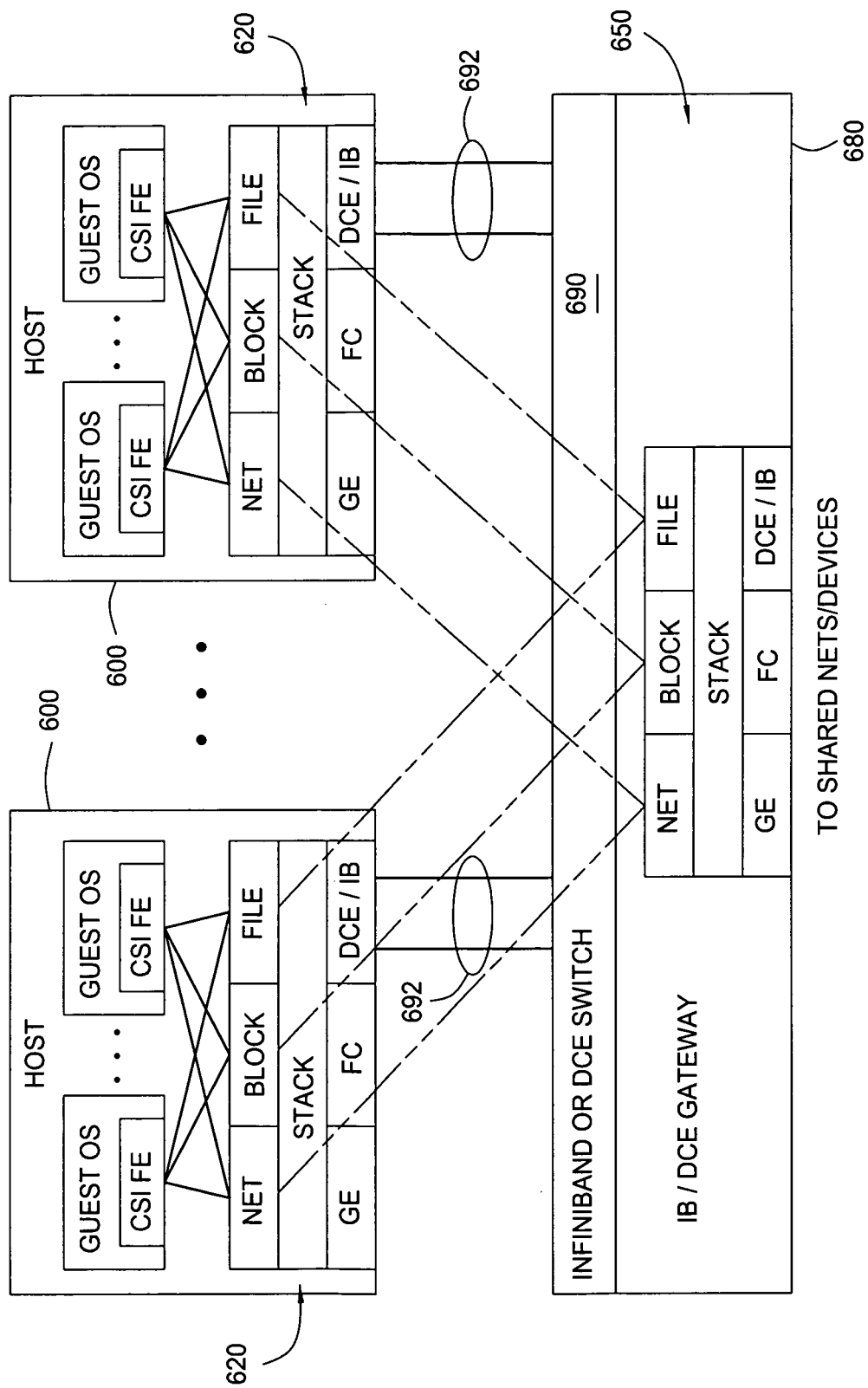
FIG. 6 illustrates an exemplary network system utilizing a remotely located offload stack, in accordance with one embodiment of the present invention.

For some embodiments, the transfer data path may be even further removed from application servers issuing sendfile commands. For example, as illustrated in FIG. 6, a "remote" offload stack 650 may be offloaded to a separate processor on a remote device 680 with a network connection to hosts 600 running the application servers. As illustrated, for some embodiments, "local" offload stacks 620 may handle local devices and functions, passing shared network, block, and file service requests directly to the offload stack 650 located on the remote device 680.

In the illustrated arrangement, network and file services may be offloaded to the remote offload stack 650 on a network device, such as a gateway. In such cases, network, block and I/O interfaces may be passed directly over whatever type of medium is used for the network connection 692, such as Infiniband or a DataCenter Ethernet, and the gateway device 680 may include a compatible switch 690. Such an offload stack 650 on a network gateway may handle shared network, file, and I/O services for an entire cluster of server hosts 600. As a result, an application server on a host 600 may be able to transfer data via a zero-copy sendfile command, even if the data only exists in the remote offload stack 650.

Conclusion

Embodiments of the present invention may achieve data transfer support for web and application servers without the data needing to be copied to or reside in the address space of the server operating systems. This "zero-copy" data transfer support may be achieved by offloading network and file system stacks to a common stack accessible by multiple operating systems in a virtual computing system and may enable an application server to handle larger volumes of traffic than achievable using conventional techniques requiring data to be copied into address space of the operating system running the application server.

While the foregoing is directed to embodiments of the present invention, other and further embodiments of the invention may be devised without departing from the basic scope thereof, and the scope thereof is determined by the claims that follow.

What is claimed is:

1. A computer-implemented method to transfer data via a buffer cache and in response to a command issued from a first application server, the command issued responsive to a request from a first client, the method comprising:

creating an offload stack running on a multiprocessing host having the buffer cache and on which a plurality of operating systems is running, wherein the plurality of operating systems includes a first operating system executing the first application server, wherein the offload stack is configured to provide a set of resources to one or more applications executing on the plurality of operating systems, the set of resources including network, file, and block I/O resources;

providing an interface to share the set of resources of the offload stack among the plurality of operating systems running on the multiprocessing host; and providing zero-copy data transfer support for the first application server by processing the command issued from the first application server to the offload stack, in order to transfer data targeted by the command, to the first client, via the buffer cache of the multiprocessing host and not via any address space of the first operating system on which the first application server is running, wherein the command specifies a source of the data to transfer, a destination to transfer the data to, and an offset to start reading the data from.

2. The method of claim 1, wherein the command includes at least a source argument to specify the source of the data to be transferred and a destination argument to specify the destination to which the data is to be transferred.

3. The method of claim 1, wherein the interface to share the set of resources of the offload stack among the plurality of operating systems running on the multiprocessing host comprises driver code executable by the plurality of operating systems.

4. The method of claim 1, wherein the offload stack is created on a data path processor separate from any computer processor on which any of the plurality of operating systems are running.

5. A host system to transfer data via a buffer cache and in response to a command issued from a first application server, the command issued responsive to a request from a first client, the host system comprising:

one or more processing cores;
the buffer cache;
multiple operating systems running on at least one of the one or more processing cores;
a first application server running on a first operating system of the multiple operating systems;
an offload stack running on at least one of the one or more processing cores, the offload stack providing zero-copy data transfer support for the first application server by processing the command issued from the first application server, in order to transfer data targeted by the command, to the first client, via the buffer cache of the host system and not via any address space of the first operating system on which the first application server is running, wherein the offload stack is configured to provide a set of resources to one or more applications executing on the plurality of operating systems, the set of resources including network, file, and block I/O resources, wherein the command specifies a source of the data to transfer, a destination to transfer the data to, and an offset to start reading the data from; and an interface to share the set of resources of the offload stack between the multiple operating systems.

6. The host system of claim 5, wherein the host system includes a plurality of processing cores including the one or more processing cores, wherein the first application server and the offload stack are running on different processing cores.

7. The host system of claim 5, wherein the command includes at least a source argument to specify the source of the data to be transferred and a destination argument to specify the destination to which the data is to be transferred.

8. The host system of claim 5, wherein the offload stack runs on a data path processing core separate from any processing core on which any of the multiple operating systems are running.

9. A system to transfer data via a buffer cache and in response to a command issued from a first application server, the command issued responsive to a request from a first client, the system comprising:

one or more computer processors;
a buffer cache;
a memory containing a program which, when executed by the one or more computer processors, performs an operation comprising:
creating an offload stack running on the system, on which system a plurality of operating systems is running, the plurality of operating systems including a first operating system executing the first application server, wherein the offload stack is configured to provide a set of resources to one or more applications executing on the plurality of operating systems, the set of resources including network, file, and block I/O resources;

providing an interface to share the set of resources of the offload stack among the plurality of operating systems running on the system; and providing zero-copy data transfer support for the first application server by processing the command issued from the first application server to the offload stack, in order to transfer data targeted by the command, to the first client, via the buffer cache of the system and not via any address space of the first operating system on which the first application server is running, wherein the command specifies a source of the data to transfer, a destination to transfer the data to, and an offset to start reading the data from.

10. The system of claim 9, wherein the command includes at least a source argument to specify the source of the data to be transferred and a destination argument to specify the destination to which the data is to be transferred.

11. The system of claim 10, wherein the interface to share the set of resources of the offload stack among the plurality of operating systems running on the system comprises driver code executable by the plurality of operating systems.

12. The system of claim 11, wherein the offload stack is created on a data path processor separate from any computer processor on which any of the plurality of operating systems are running.

13. A non-transitory computer-readable medium containing program code which, when executed, performs an operation to transfer data via a buffer cache and in response to a command issued from a first application server, the command issued responsive to a request from a first client, the operation comprising:
    creating an offload stack running on a multiprocessing host having the buffer cache and on which a plurality of operating systems is running, wherein the plurality of operating systems includes a first operating system executing the first application server, wherein the offload stack is configured to provide a set of resources to one or more applications executing on the plurality of operating systems, the set of resources including network, file, and block I/O resources;
    providing an interface to share the set of resources of the offload stack among the plurality of operating systems running on the multiprocessing host; and
    providing zero-copy data transfer support for the first application server by processing the command issued from the first application server to the offload stack, in order to transfer data targeted by the command, to the first client, via the buffer cache of the multiprocessing host and not via any address space of the first operating system on which the first application server is running, wherein the command specifies a source of the data to transfer, a destination to transfer the data to, and an offset to start reading the data from.

14. The non-transitory computer-readable medium of claim 13, wherein the offload stack is created on a data path processor separate from any computer processor on which any of the plurality of operating systems are running.

15. The method of claim 1, wherein the interface to share the set of resources of the offload stack between the multiple operating systems running on the multiprocessing host comprises driver code executable by the plurality of operating systems.

16. The method of claim 15, wherein the offload stack is created on a data path processing element separate from any processing element on which any of the multiple operating systems are running, wherein each processing element is selected from a computer processor and a processing core.

17. The method of claim 16, wherein the command issued from the first application server is issued responsive to the first application server receiving the request from the first client, wherein the first client comprises a remote client of the first application server.

18. The method of claim 17, wherein the method further comprises: providing zero-copy data transfer support for a second application server by processing a command issued from the second application server to the offload stack, in order to transfer data targeted by the command, to a second client, via the buffer cache of the multiprocessing host and not via any address space of a second operating system on which the second application server is running.

19. The method of claim 18, wherein the second operating system is different from the first operating system, wherein the second application is different from the first application, wherein the second client is different from the first client, wherein the command issued from the second application server is issued responsive to the second application server receiving a request from the second client, wherein the second client comprises a remote client of the second application.

20. The method of claim 19, wherein the first operating system and the second operating system are of different operating system types, wherein the first application and the second application are of different application types, wherein the offload stack does not occupy any address space of the first operating system.

21. The method of claim 20, wherein the data is transferred without copying the data from the buffer cache to any kernel address space of the first operating system, without copying the data from any kernel address space of the first operating system to any user address space of the first operating system, and without copying the data from any user address space of the first operating system to any socket buffer of the first operating system.

22. The method of claim 21, wherein the multiprocessing host consists of a single host system, wherein the multiprocessing host includes a plurality of processing elements, wherein the offload stack runs solely on a first processing element of the plurality of processing elements, wherein the first operating system runs solely on a second processing element of the plurality of processors elements, wherein the first processing element is different from the second processing element.

23. The method of claim 22, wherein the data targeted by the command is transferred to the first client using a socket connection via a socket buffer of the multi-core host, wherein the socket buffer is different from the buffer cache, wherein the socket buffer comprises a TCP socket buffer.

24. The method of claim 23, wherein the buffer cache does not occupy any address space of the first operating system, wherein the buffer cache does not occupy any address space of the second operating system, wherein the socket buffer does not occupy any address space of the first operating system, wherein the socket buffer does not occupy any address space of the second operating system.

* * * * *